United States Patent [19]

Jacobson et al.

[11] Patent Number: 5,695,322
[45] Date of Patent: Dec. 9, 1997

[54] TURBINE BLADE HAVING RESTART TURBULATORS

[75] Inventors: Craig Robert Jacobson, Peabody; Robert Francis Manning, Newburyport; Elias Harry Lampes, Lynn, all of Mass.

[73] Assignee: General Electric Company, Cincinnati, Ohio

[21] Appl. No.: 809,605

[22] Filed: Dec. 17, 1991

[51] Int. Cl.$^6$ ............................................. F01D 5/18
[52] U.S. Cl. ........................ 416/97 R; 416/96 A; 415/115
[58] Field of Search ........................... 415/115; 416/97 R, 416/96 A, 232, 233; 89/14.1

[56] References Cited

U.S. PATENT DOCUMENTS

| | | | |
|---|---|---|---|
| 3,628,885 | 12/1971 | Sidenstick et al. | 416/97 |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 415/115 |
| 4,278,400 | 7/1981 | Yamarik et al. | 416/97 R |
| 4,416,585 | 11/1983 | Abdel-Messeh | 416/97 R |
| 4,462,754 | 7/1984 | Schofield | 415/115 |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 415/115 |
| 4,992,026 | 2/1991 | Ohtomo et al. | 415/115 |
| 5,052,889 | 10/1991 | Abdel-Messeh | 416/97 R |

FOREIGN PATENT DOCUMENTS

| | | | |
|---|---|---|---|
| 2112467 | 7/1983 | United Kingdom | F01D 5/18 |

OTHER PUBLICATIONS

J.C. Han et al, "Augmented Heat Transfer in Square Channels With Parallel, Crossed, and V-Shaped Ribs," submitted to ASME Journal of Heat Transfer, Jun. 1990, pp. 1–23 and Figures 1–13.

S.D. Spring, "Improved Methods For Determining Heat Transfer," The Leading Edge, Winter 1987/1988, Contents page and pp. 4–9.

Metzger–Vedula–Breen, "The Effect of Rib Angle and Length on Convection Heat Transfer in Rib–Roughened Triangular Ducts," ASME–JSME Thermal Engineering Conference vol. 3, 1987, pp. 327–333.

Metzger–Fan–Yu, "Effects of Rib Angle and Orientation on Local Heat Transfer in Square Channels with Angled Roughness Ribs", *Compact Heat Exchangers*, copyright 1989, pp: Title and 151–167.

*Primary Examiner*—Michael J. Carone
*Assistant Examiner*—Theresa M. Wesson
*Attorney, Agent, or Firm*—Andrew C. Hess; Wayne O. Traynham

[57] ABSTRACT

A turbine blade includes an airfoil having first and second opposite sides and an internal passage extending longitudinally therebetween for channeling air to cool the airfoil. A single restart turbulator rib is disposed in the passage adjacent to the inlet and has a first height $e_1$ for obtaining a first convective heat transfer enhancement. A plurality of primary turbulator ribs are disposed downstream from the restart rib in the passage. The primary ribs include an initial primary rib having a second height $e_2$ for obtaining a second convective heat transfer enhancement, with the initial primary rib being spaced longitudinally from the restart rib at a first spacing $S_1$, and spaced longitudinally from a second primary rib at a second spacing $S_2$. The first enhancement is less than the second enhancement to reduce overcooling of the airfoil between the restart and primary ribs.

12 Claims, 6 Drawing Sheets

TURBINE BLADE HAVING RESTART TURBULATORS

TECHNICAL FIELD

The present invention relates generally to gas turbine engines, and, more specifically, to air cooled turbine blades and vanes therein.

BACKGROUND ART

In a conventional gas turbine engine, a compressor pressurizes air which is channeled to a combustor, mixed with fuel, and ignited for generating combustion gases which flow to a turbine disposed downstream therefrom. The turbine extracts energy from the hot combustion gases for powering the compressor. Energy from the combustion gases is also used to propel an aircraft in flight, with one or more turbines either driving a conventional fan for obtaining thrust, or simply discharging the combustion gases from a conventional exhaust nozzle for generating thrust for powering the aircraft.

Conventional turbines include one or more stages of stationary stator nozzles or vanes and rotating rotor blades which typically extract energy from the combustion gases by reaction. The blades and vanes are typically air cooled by a portion of the air pressurized by the compressor in order to provide acceptable life in the gas turbine engine. However, any portion of the compressed air which is utilized for cooling the blades and vanes is not available for undergoing combustion which, therefore, reduces the overall efficiency of the engine. Accordingly, it is desirable to use as little of the compressed air as possible in cooling the blades and vanes consistent with obtaining relatively long useful life of the blades and vanes, which is typically accomplished by providing heat transfer enhancement members such as elongate turbulator ribs within the blades and vanes.

Since gas turbine engine blades and vanes include an airfoil portion over which the combustion gases flow, which airfoil portion includes an internal passage for channeling the cooling air and also contains the turbulator ribs, the term blade as used herein shall mean any member placed within the gas turbine engine flowpath over which flows the combustion gases, such as conventional rotor blades or stator vanes or nozzles.

Turbulator ribs typically used in such blades are conventionally formed as part of the blade casting and project inwardly into the internal passage of the blade through which the cooling air is channeled. The ribs enhance the convective heat transfer coefficient along the inner surface of the blade by tripping or disrupting the cooling air boundary layer which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter.

Enhancement is conventionally related to the height or projection of the ribs into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.05 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing therebetween for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases. Accordingly, the effectiveness of turbulator ribs must be evaluated by their ability to provide effective enhancement without undesirable levels of pressure losses associated therewith.

The heat transfer enhancement required from the turbulator ribs is selected for particular blade designs and operating environment including the temperature of the combustion gases flowable thereover and stresses occurring in the blade. A primary design parameter is conventionally known creep life which is a function of temperature and stress occurring in the blade. Both the temperature and stress experienced by the blade varies around its surface, with a specific location resulting in minimum creep life for the blade. The minimum creep life for the blade must be selected to ensure an acceptable service life of the blade and is typically increased as required by providing increased cooling of the blade. Accordingly, a conventional blade is typically designed with equally configured turbulator ribs on both sides of the airfoil in the cooling air passages to provide uniform heat transfer enhancement on both sides of the blade for obtaining an acceptable service life. The pressure drop caused by the turbulator ribs is suitably accommodated by providing sufficient airflow and driving pressure for effective operation.

OBJECTS OF THE INVENTION

Accordingly, one object of the present invention is to provide a new and improved gas turbine engine blade.

Another object of the present invention is to provide an improved blade having a local increase in enhancement with reduced pressure loss and cooling flow.

Another object of the present invention is to provide an improved blade having improved creep life with reduced cooling flow.

DISCLOSURE OF INVENTION

A turbine blade includes an airfoil having first and second opposite sides and an internal passage extending longitudinally therebetween for channeling air to cool the airfoil. A single restart turbulator rib is disposed in the passage adjacent to the inlet and has a first height $e_1$ for obtaining a first convective heat transfer enhancement. A plurality of primary turbulator ribs are disposed downstream from the restart rib in the passage. The primary ribs include an initial primary rib having a second height $e_2$ for obtaining a second convective heat transfer enhancement, with the initial primary rib being spaced longitudinally from the restart rib at a first spacing $S_1$, and spaced longitudinally from a second primary rib at a second spacing $S_2$. The first enhancement is less than the second enhancement to reduce overcooling of the airfoil between the restart and primary ribs.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
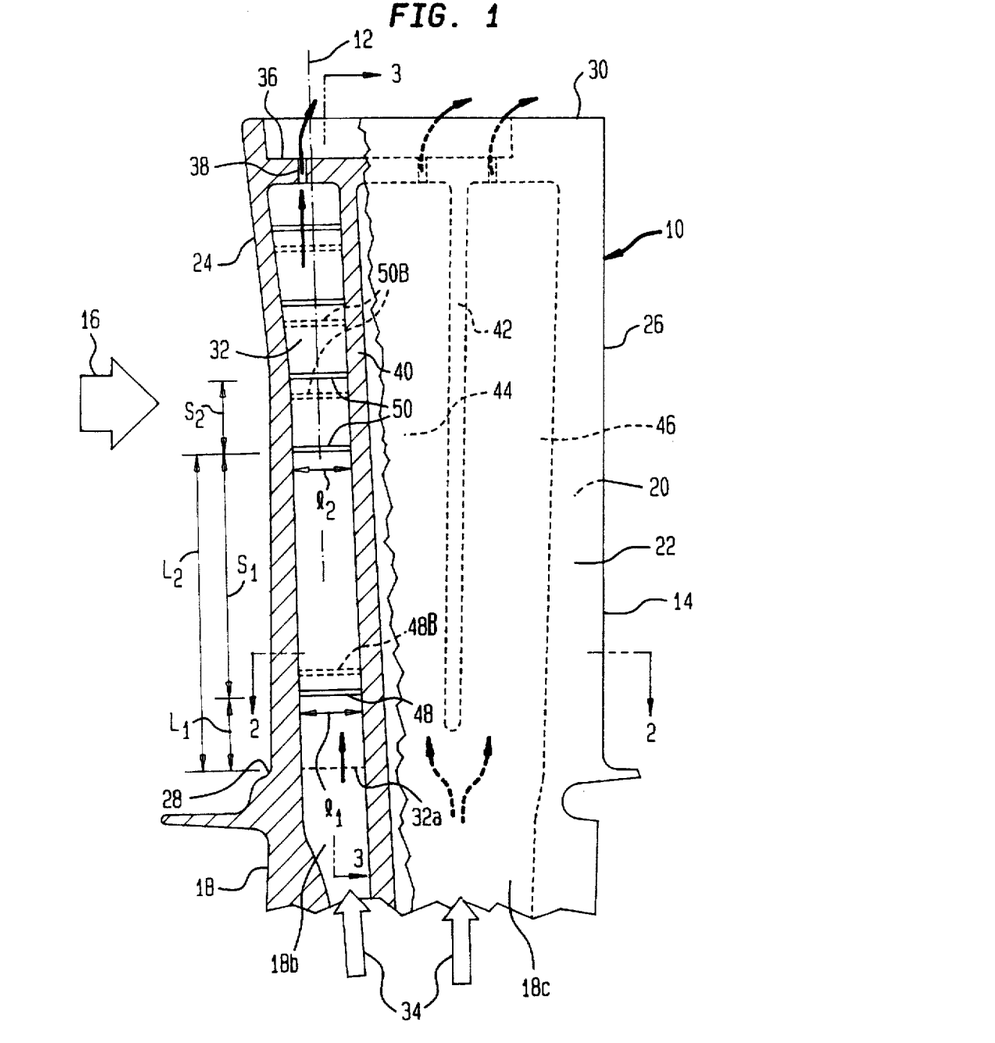
FIG. 1 is a schematic, elevation view, partly in section, of an exemplary gas turbine engine rotor blade having turbulators in accordance with one embodiment of the present invention.

Illustrated schematically in FIG. 1 is an exemplary gas turbine engine rotor blade 10 having a longitudinal or radial axis 12. The blade 10 includes an airfoil 14 which is conventionally disposed in a gas turbine engine (not shown) and over which flows hot combustion gases 16 generated by a conventional combustor (not shown). As used herein, the term blade shall mean any member disposed within a hot gas flow such as the combustion gases 16 and, for example, includes the rotor blade 10 illustrated, and stator vanes or nozzles. The blade 10 as a rotor blade is conventionally joined to a rotor disk (not shown) by a conventional dovetail 18 extending downwardly from the airfoil 14. The blade 10 may also represent a conventional stator vane or nozzle wherein the airfoil 14 is conventionally joined to a stator casing and conventionally channels the combustion gases 16 to conventional rotor blades disposed downstream therefrom (not shown).

The outer configuration of the airfoil 14 is conventional and includes a first sidewall, or side, 20, which is also known as the concave or pressure side of the airfoil 14, and a second sidewall, or side, 22, which is also known as the convex or suction side of the airfoil 14. The first and second sides 20 and 22 are joined together at a longitudinally extending leading edge 24 and a trailing edge 26 and extend longitudinally from a root 28 to a tip 30. The root 28 is the lowermost portion of the airfoil 14 over which the combustion gases 16 flow, and the tip 30 is the outermost portion of the airfoil 14 over which the gases 16 flow. The root 28 and the tip 30 define therebetween a flow span of the airfoil over which the combustion gases 16 flow during operation, with the root 28 being at 0% span and the tip 30 being at 100% span.

Figure 2:
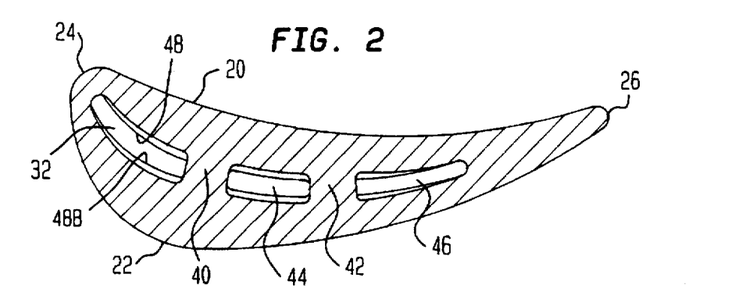
FIG. 2 is a transverse, partly sectional view of the blade illustrated in FIG. 1 taken along line 2—2.

Referring to both FIGS. 1 and 2, the airfoil 14 includes an internal passage 32 which extends longitudinally between the first and second sides 20 and 22 for channeling compressed air 34 as cooling air to cool the airfoil 14. More specifically, the cooling air 34 is conventionally channeled from a compressor of the gas turbine engine (not shown) through the dovetail 18 and upwardly into the airfoil 14. The cooling air then flows upwardly through the passage 32 to a conventional tip cap 36 which is recessed in from the tip 30. A plurality of tip holes 38 extend through the tip cap 36 in flow communication with the passage 32 for discharging therefrom the cooling air 34.

Figure 1A:
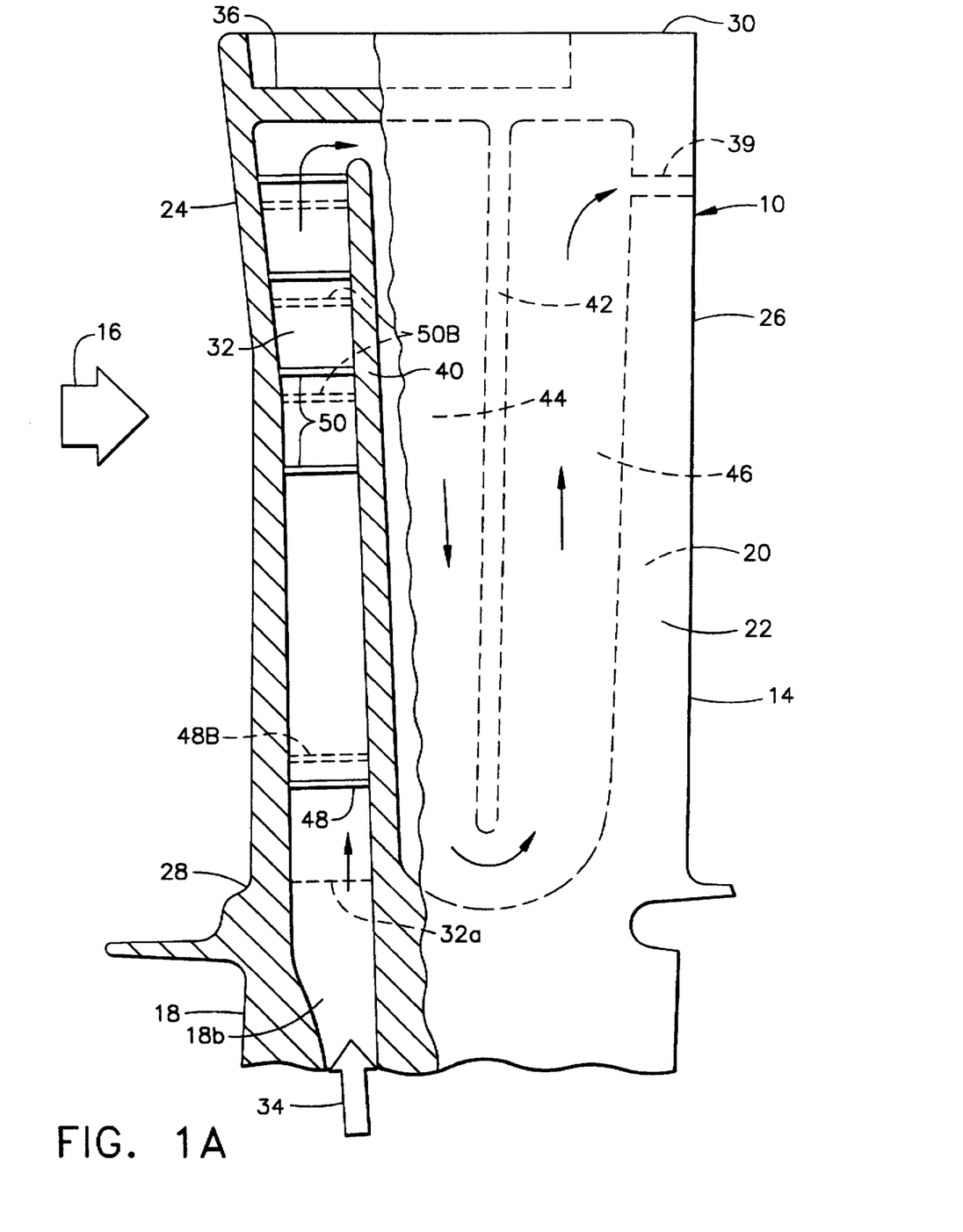
FIG. 1A is an alternate embodiment of the present invention depicted in FIG. 1.

In this exemplary embodiment of the blade 10, conventional first and second chordwise spaced partitions 40 and 42 extend longitudinally downwardly from the tip cap 36, with the first partition 40 extending below the root 28, and the second partition 42 extending to the root 28. Also in this exemplary embodiment, the passage 32 is a substantially straight leading edge passage extending longitudinally upwardly from the root 28 toward the tip 30 and between the leading edge 24 and the first partition 40. The passage 32 includes an inlet 32a at the root end thereof at 0% span for receiving the cooling air 34 from a first passage 18b extending through the dovetail 18. The passage 32 also includes an outlet at an opposite, tip end thereof for discharging the cooling air 34 therefrom. In the exemplary embodiment illustrated, the outlet of the passage 32 is the tip hole 38 disposed in the tip cap 36, although in alternate embodiments, the passage 32 could be conventionally serpentine and having an outlet 39 or outlets at the trailing edge 26 for example, as shown in FIG. 1A.

Also in this exemplary embodiment, the first and second sides 20 and 22 are preferably imperforate between the leading edge 24 and the first partition 40 for defining a closed leading edge passage 32 except for the inlet 32a at the root 28 and the outlet tip hole 38 adjacent the tip 30. In this way, the leading edge passage 32 is provided with its own source of cooling air 34 channeled from the dovetail first passage 18b longitudinally upwardly through the leading edge passage 32 and discharged through the tip hole 38.

A midchord passage 44 is defined between the first and second partitions 40 and 42 and the first and second sides 20 and 22 and extends downwardly from the tip cap 36 to the root 28 wherein it is disposed in flow communication with a second passage 18c of the dovetail 18. A trailing edge passage 46 is similarly defined between the second partition 42 and the trailing edge 26 and between the first and second sides 20 and 22 and extends downwardly from the tip cap 36 to the root 28 and in flow communication with the dovetail second passage 18c. Accordingly, a portion of the cooling air 34 is independently channeled through the dovetail second passage 18c and into both the midchord passage 44 and the trailing edge passage 46 and discharged therefrom through the tip holes 38 disposed in flow communication therewith.

During operation, the combustion gases 16 flow over the airfoil 14 from the leading edge 24 to the trailing edge 26, and the airfoil 14 along the leading edge 24 typically experiences elevated temperatures along the entire span from the root 28 to the tip 30 therefrom. Furthermore, since the blade 10 in this exemplary embodiment is a rotor blade, it is subject to relatively high centrifugal stress which, when combined with the elevated temperatures of the airfoil 14 due to the combustion gases 16, effect creep. Since the temperature and stress of the airfoil 14 vary considerably from the root 28 to the tip 30 and from the leading edge 24 to the trailing edge 26, the amount of creep also correspondingly varies. In order to provide an acceptable creep life for the blade 10, conventional chordwise extending turbulator ribs, for example, are typically disposed in the leading edge passage 32 at uniform longitudinal spacings therebetween for obtaining a predetermined amount of convective heat transfer enhancement for ensuring an acceptable creep life of the blade 10. Enhancement is a conventional normalized parameter comparing convective heat transfer coefficient due to the turbulator ribs with the convective heat transfer coefficient due to a smooth wall without turbulator ribs. Conventional values of enhancement range up to several times the value of one.

However, using conventional turbulator ribs also provides a partial obstruction to the flow of the cooling air through the airfoil 14, and a resulting pressure loss, which must be suitably accommodated by providing the cooling air 34 at correspondingly larger driving pressures and flowrates. It is desirable to reduce the amount of the cooling air 34 for improving overall efficiency of the gas turbine engine including the blade 10.

Accordingly, in accordance with the present invention, a single, i.e., only one, boundary layer restart turbulator rib 48 is disposed in the leading edge passage 32 at a predetermined span position adjacent to the inlet 32a for effecting a first convective heat transfer enhancement on the airfoil first side 20 downstream from the restart rib 48. In the preferred embodiment, an additional single one of the restart rib 48, designated 48B, is also disposed on the second side 22 generally oppositely to the restart rib 48 on the first side 20, so that only one of the restart ribs 48, 48B is disposed on each of the sides 20, 22. Since the restart ribs 48, 48B are substantially identical in configuration and function, the restart rib 48 on the first side 20 will be described in more detail, with it being understood that the restart rib 48B on the second side 22 is substantially identical.

Without the restart rib 48, the enhancement due to the cooling air 34 channeled into the leading edge passage 32 from the dovetail first passage 18b decreases along the span from the root 28 to the tip 30. For example, the initial enhancement of the cooling air 34 in the dovetail first passage 18b is greater than about 10, and would decrease rapidly as the cooling air 34 flows through the leading edge passage 32 without ribs. Since the temperature distribution of the combustion gases 16 is generally center-peaked with a maximum value between the root 28 and the tip 30, it has been discovered that by preferentially locating the restart rib 48 in the passage 32, that a plurality of conventional primary turbulator ribs 50 may be disposed considerably downstream from the restart rib 48 for providing a reduced total number of primary ribs 50 in the passage 32 for reducing pressure losses, and thereby improving performance, while maintaining an acceptable amount of enhancement with an acceptable creep life for the blade 10. Similarly, an additional plurality of the primary ribs 50, designated 50B, are disposed on the second side 22 generally oppositely to the primary ribs 50 on the first side 20. Since the primary ribs 50B are substantially identical in configuration and function to the primary ribs 50, the following detailed description of the primary ribs 50 shall apply equally to the primary ribs 50B.

Figure 1B:
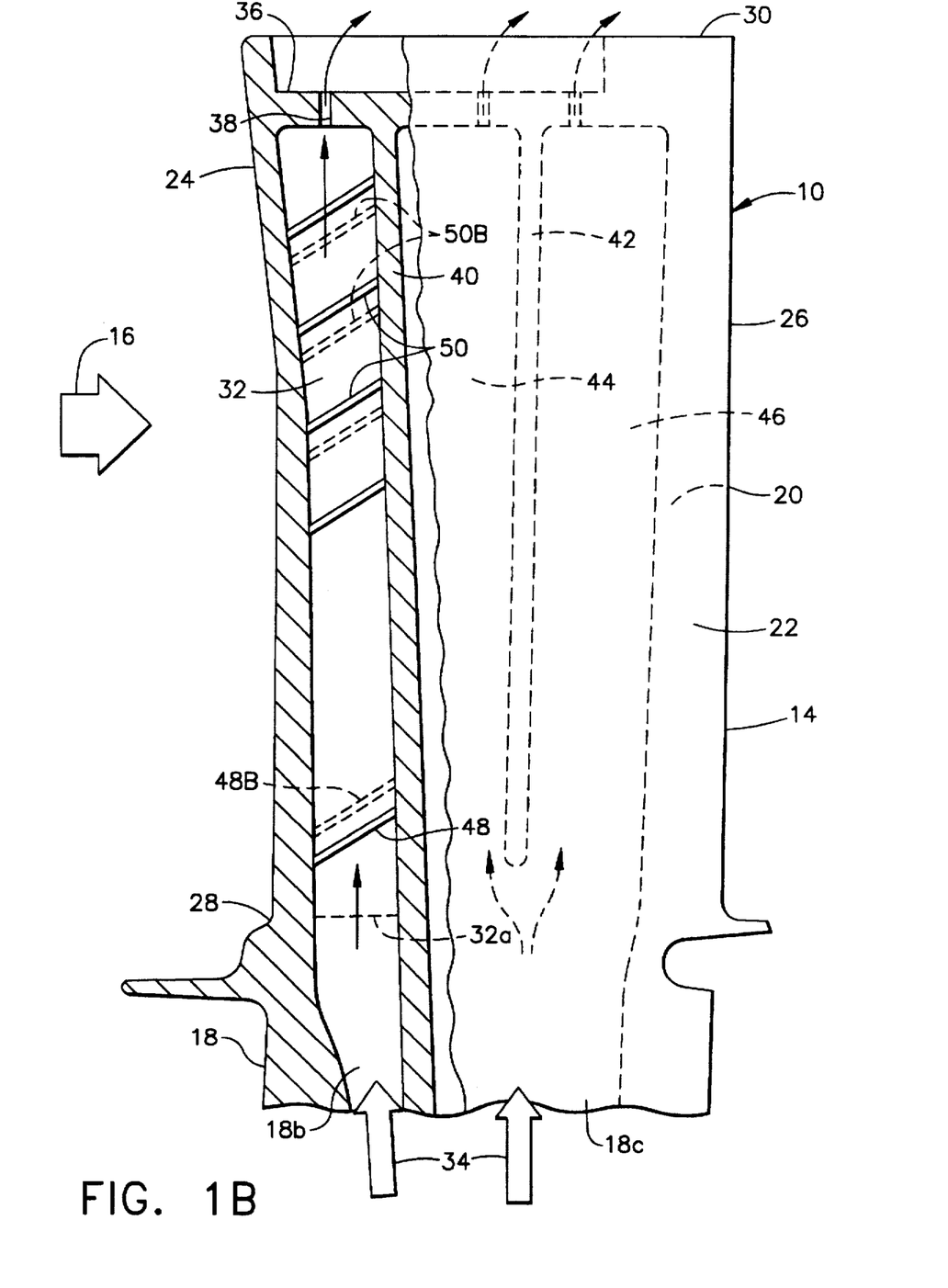
FIG. 1B is yet another embodiment of the present invention depicted in FIG. 1.

In the exemplary embodiment illustrated in FIGS. 1 and 2, the restart and primary ribs 48 and 50 preferably extend chordwise in the direction from the leading edge 24 toward the trailing edge 26, and substantially perpendicularly to the cooling air 34 flowable longitudinally thereover. The longitudinal axis 12 extends through the passage 32 and the cooling air 34 flows generally parallel thereto, and, therefore, the ribs 48, 50 are preferably disposed substantially perpendicularly to the longitudinal axis 12. In alternate embodiments of the invention, the restart and primary ribs 48 and 50 could be conventionally inclined relative to the direction of flow of the cooling air 34, for example, as depicted in FIG. 1B.

The restart and primary ribs 48 and 50 are preferably elongate and have chordwise lengths $I_1$ and $I_2$, respectively, and extend substantially completely from the leading edge 24 to the first partition 40 along the first side 20. As shown in FIG. 2, the restart ribs 48, 48B are integral with the first partition 40 and extend along respective first and second sides 20 and 22 to the leading edge 24 while maintaining a generally constant transverse space therebetween.

In the exemplary embodiment illustrated in FIG. 1, the combustion gases 16 have a peak temperature at about 70% of the airfoil span. Accordingly, the temperature of the combustion gases 16 decreases from the 70% span position to the root 28. This temperature variation may be utilized in accordance with the present invention to prevent the over cooling of the airfoil 14 between the root 28 and the mid-span, for example, which would occur with a conventionally turbulated passage and, therefore, allow a reduced amount of the cooling air 34 for effectively cooling the airfoil 14.

Figure 3:
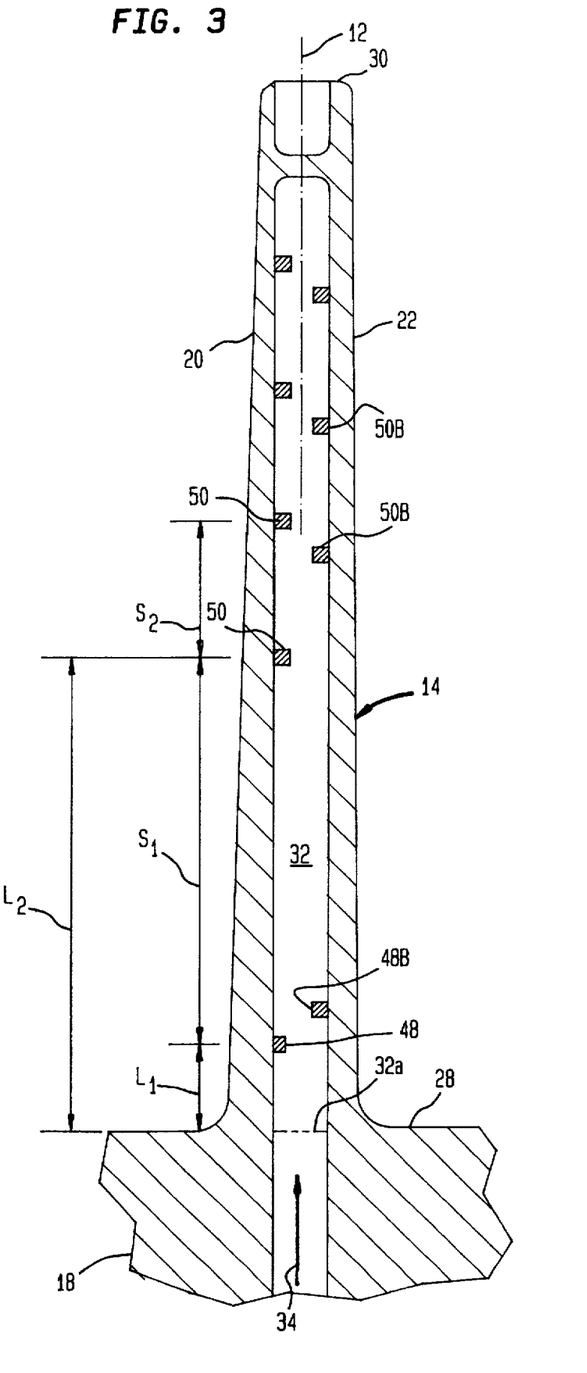
FIG. 3 is a longitudinal sectional view of the blade illustrated in FIG. 1 taken along line 3—3.
Figure 4:
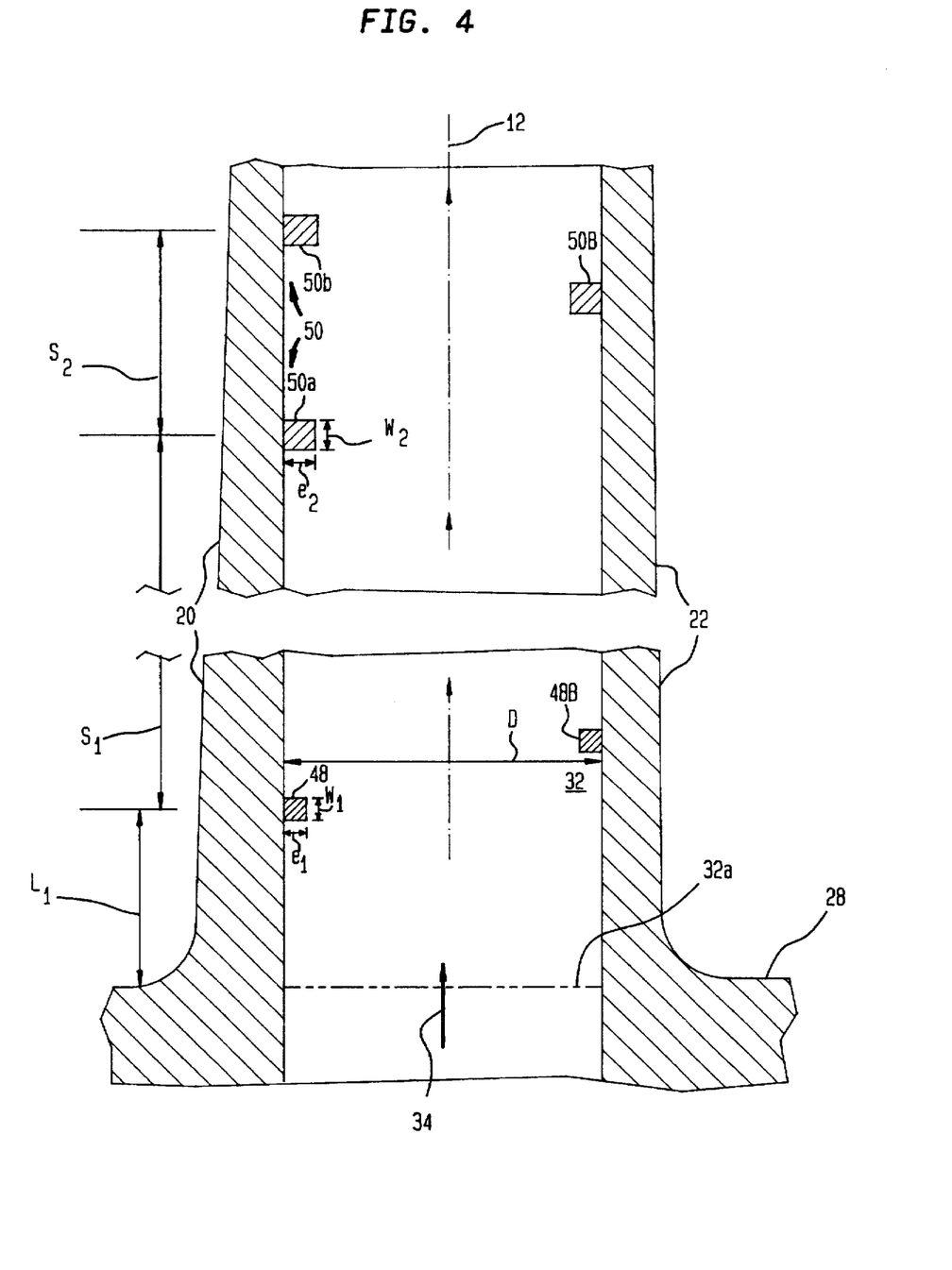
FIG. 4 is an enlarged longitudinal sectional view of portions of the blade illustrated in FIG. 3.

More specifically, the restart rib 48 is predeterminedly positioned in the leading edge passage 32 adjacent to the inlet 32a to provide a predetermined first enhancement at that location which gradually degrades until augmented by the primary ribs 50. For example, the restart rib 48 is spaced upwardly from the root 28 at a first longitudinal distance $L_1$ of about 10% of the airfoil span from the root 28 as shown in FIGS. 1 and 3. And, as shown more particularly in FIG. 4, the restart rib 48 extends perpendicularly inwardly from the first side 20 partially into the leading edge passage 32 adjacent to the inlet 32a and has a first height $e_1$ for obtaining the first enhancement of the first side 20 adjacent to the restart rib 48. The first and second sides 20 and 22 are spaced apart at a distance D at the restart rib 48, and the ratio $e_1/D$ is conventional for providing effective enhancement, and may range, for example, from about 0.05 and up. Although the parameter D represents the sidewall spacing in this exemplary embodiment, it may also represent the conventionally known hydraulic diameter which is four times the flow area divided by the wetted perimeter.

Referring again to FIG. 3, the primary ribs 50 are disposed downstream from the restart rib 48 In the passage 32, and extend perpendicularly inwardly from the first side 20 partially into the leading edge passage 32. And, as shown in more particularity in FIG. 4, the primary ribs 50 include an initial primary rib 50a having a second height $e_2$ for obtaining a second convective heat transfer enhancement of the first side 20 downstream from the initial primary rib 50a. The initial primary rib 50a is spaced longitudinally upwardly from the restart rib 48 at a first longitudinal spacing $S_1$ measured between corresponding positions such as the centerlines of the ribs 48, 50a. A second primary rib 50b is spaced longitudinally upwardly from the initial primary rib 50a at a second longitudinal spacing $S_2$. Any suitable number of primary ribs 50, 50B may be used, all of which have preferably identical configurations including equal heights $e_2$. The ratio of the primary rib height $e_2$ over the spacing D at each of the primary ribs 50, i.e., $e_2/D$ is also conventional and may also range from about 0.05 and up.

In accordance with the present invention, the first side 20 between the restart rib 48 and the initial primary rib 50a along the leading edge passage 32 is preferably completely smooth without flow obstructions such as turbulators or similar members which would enhance the heat transfer coefficient therebetween. And, the first enhancement effected by the restart rib 48 is preferably less than the second enhancement effected by the primary ribs 50. Whereas conventional turbulator ribs are typically equally longitudinally spaced apart for obtaining equal longitudinal spacing-to-height ratios, the ratio $S_1/e_1$ for the restart rib 48 is considerably greater than the ratio $S_2/e_2$ for the initial primary rib 50a in accordance with the present invention for allowing the first enhancement to gradually degrade to the initial primary rib 50a to prevent overcooling of the first side 20 between the ribs 48 and 50.

Whereas conventional turbulator ribs have equal longitudinal spacing-to-height ratios of about 5 to about 10, it is preferred that the $S_1/e_1$ ratio is considerably greater than the conventional maximum value, or about 10, for example, and the $S_2/e_2$ ratio is less than that maximum value of about 10. With such ratios of less than about 10, conventional turbulator ribs provide a generally uniform or average enhancement along the direction of cooling airflow. With a ratio greater than about 10, enhancement necessarily decreases in the direction of cooling airflow.

Since in this exemplary embodiment, the temperature distribution of the combustion gases 16 is center-peaked at about 70% span, the initial primary rib 50a is preferably spaced upwardly from the root 28 at a second longitudinal spacing $L_2$ at about mid-span of the airfoil 14, or at about 50% of the span measured from the root 28. Since a plurality of the primary ribs 50 are used on the first side 20, as illustrated in FIG. 3 for example, a generally uniform and effective enhancement may be obtained from midspan to the blade tip 30 for accommodating the peaked temperature profile combustion gases 16. The respective longitudinal spacing-to-height ratios of the several primary ribs 50 are preferably within a conventional range below about 10.

Referring again to FIG. 4, the first longitudinal spacing $S_1$ is preferably considerably greater than the second longitudinal spacing $S_2$, with the respective $S_1/e_1$ ratio being considerably greater than the ratio $S_2/e_2$ so that the first enhancement due to the restart rib 48 is allowed to gradually decrease to the initial primary rib 50a, with the first enhancement being less than the second enhancement. For example, the first enhancement may be about 2 and the second enhancement may be about 4, which may be obtained by using a restart rib 48 having a height $e_1$ of about 0.3 mm and primary rib 50 having a height $e_2$ of about 0.7 mm, with respective ratios $S_1/e_1$ of about 48 and $S_2/e_2$ of about 8. The restart rib 48 also has a first width $w_1$ which may be about 0.4 mm for example, and each of the primary ribs 50 also has a second width $w_2$ which may be about 1.0 mm for example. The ribs 48 and 50 having such configurations may be conventionally cast in the airfoil 14.

The minimum height $e_1$ of the restart rib 48 which may be used in practice is any height greater than the height of the boundary layer of the cooling air 34 which flows along the inside surface of the first side 20. In this way, the restart rib 48 is effective for restarting the boundary layer of the cooling air 34 for effecting the first enhancement for suitably cooling the airfoil between the restart rib 48 and the initial primary rib 50a along the first side 20. Since the first enhancement due to the restart rib 48 decreases as the cooling air 34 flows upwardly through the leading edge passage 32 toward the tip 30, the initial primary rib 50a is predeterminedly positioned for effecting the second enhancement for, thusly, increasing the cooling effectiveness of the cooling air 34 as it flows upwardly from the initial primary rib 50a. The primary ribs 50 are preferably conventionally configured and longitudinally spaced, e.g., conventional $e_2/D$ and $S_2/e_2$ ratios, for providing an effective second enhancement for suitably cooling the first side 20 heated by the combustion gases 16 from the initial primary rib 50a to the tip 30.

Since no enhancement members or turbulators are provided between the restart rib 48 and the initial primary rib 50a for the considerable distance $S_1$ from 10% to 50% of the airfoil span, pressure losses and heat pickup are reduced in the cooling air 34 over those which would be obtained if additional turbulators were provided therein. Without such additional turbulators, the first side 20 is less effectively cooled between the restart rib 48 and the initial primary rib 50a which is acceptable in view of the center-peaked temperature profile of the combustion gases 16 which is suitably accommodated by the primary turbulators 50. In this way, the first side 20 between the restart rib 48 and the initial primary rib 50a is not overcooled as typically found in conventional designs, and, therefore, the cooling air 34 is not overheated thereby. The cooling air 34 is, therefore, more effective for cooling the first side 20 from the initial primary turbulator 50a to the tip 30 since it picks up less heat between the restart rib 48 and the initial primary rib 50a.

Accordingly, creep life of the blade 10 may be increased using the present invention since the airfoil 14 is more effectively cooled from the midspan at the initial primary rib 50a to the tip 30, and a considerable reduction in the amount of the cooling air 34 may be obtained since it is more effectively used.

Figure 3A:
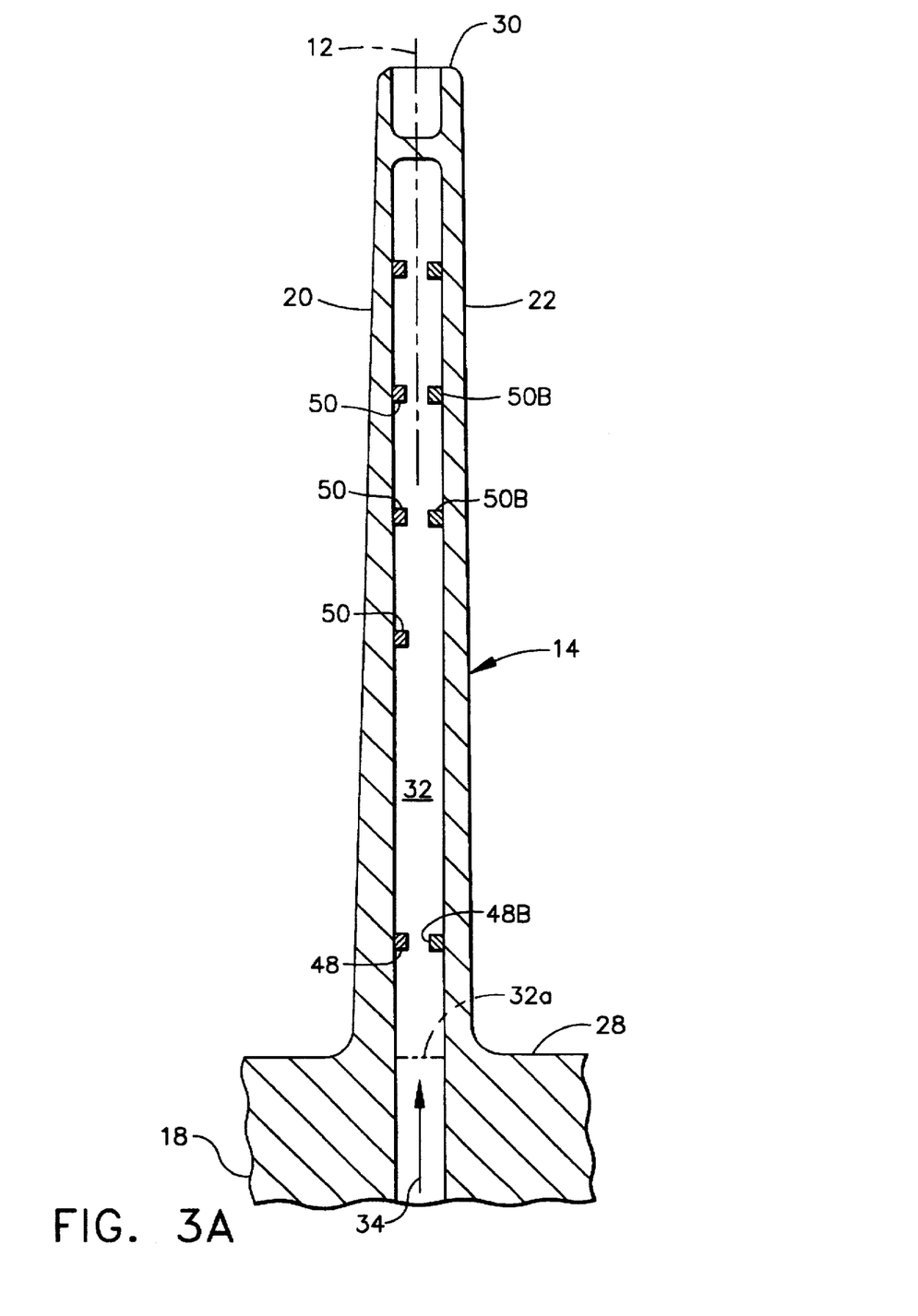
FIG. 3A is an alternate embodiment of the present invention depicted in FIG. 3.

Referring again to FIG. 4, the restart ribs 48B and the primary ribs 50B on the second side 22 are preferably staggered longitudinally relative to respective ones of the restart ribs 48 and primary ribs 50 on the first side 20. As shown in FIG. 3, the restart rib 48B and the primary ribs 50B are preferably staggered longitudinally upwardly relative to the respective restart rib 48 and primary ribs 50. The restart rib 48B and the primary ribs 50B may alternatively be disposed longitudinally in-line with respective ones of the restart rib 48 and the primary ribs 50 if desired as shown in FIG. 3A. Other configurations may be used for selectively providing respective enhancements on the first and second sides 20 and 22 as required for accommodating the creep inducing temperature and stress distribution thereon for particular designs.

The ribs 48, 48B and 50, 50B may be used as disclosed above in the leading edge passage 32, or in alternate embodiments of the present invention they may be used in the midchord passage 44 or the trailing edge passage 46, or any other type of elongate passage having a suitable longitudinal extent for preferentially spacing the initial primary rib 50a from the restart rib 48 for eliminating turbulator ribs which would otherwise be provided therebetween for decreasing pressure losses, and thusly improving overall performance of the gas turbine engine utilizing such blades.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine blade having a longitudinal axis comprising:

an airfoil having a first side and an opposite second side joined together at a leading edge and a trailing edge, and extending longitudinally from a root to a tip defining therebetween a flow span of said airfoil, and an internal passage extending longitudinally between said first and second sides for channeling air to cool said airfoil, said passage having an inlet at one end for receiving said cooling air, and an outlet at an opposite end for discharging said cooling air;

a single restart turbulator rib extending inwardly from said first side into said passage adjacent to said inlet and having a first height $e_1$ for effecting a first convective heat transfer enhancement on said first side;

a plurality of primary turbulators ribs disposed downstream from said restart rib and extending inwardly from said first side into said passage, and including an initial primary rib having a second height $e_2$ for effecting a second convective heat transfer enhancement on said first side and spaced longitudinally from said restart rib at a first spacing $S_1$, and a second primary rib spaced longitudinally from said initial primary rib at a second spacing $S_2$, said first side between said restart rib and said initial primary rib along said passage being smooth without flow obstructions; and the ratio $S_1/e_1$ being greater than the ratio $S_2/e_2$.

2. A blade according to claim 1 wherein said ratio $S_1/e_1$ is greater than about 10, and said ratio $S_2/e_2$ is less than about 10.

3. A blade according to claim 1 wherein said first enhancement is less than said second enhancement.

4. A blade according to claim 1 wherein said restart and primary ribs extend substantially completely along said first side in said passage.

5. A blade according to claim 1 wherein said airfoil includes a first partition extending longitudinally from said tip toward and below said root and spaced between said leading edge and said trailing edge, and said passage is a leading edge passage extending from said root toward said tip and between said leading edge and said first partition, and said inlet is disposed at said root, and said outlet is disposed adjacent to said tip.

6. A blade according to claim 5 wherein said initial primary rib is disposed at about mid-span of said airfoil.

7. A blade according to claim 6 wherein said restart rib is disposed at about 10% of said airfoil span from said root for allowing said first enhancement to decrease to said initial primary rib.

8. A blade according to claim 7 wherein said restart and primary ribs extend substantially completely from said leading edge to said first partition along said first side.

9. A blade according to claim 8 wherein said restart and primary ribs extend chordwise in said passage and substantially perpendicularly to said longitudinal axis and said cooling air flowable longitudinally therethrough.

10. A blade according to claim 9 wherein said ratio $S_1/e_1$ is greater than about 10, and said ratio $S_2/e_2$ is less than about 10.

11. A blade according to claim 10 wherein said airfoil further includes an additional one of said restart rib disposed on said second side oppositely to said restart rib on said first side, and an additional plurality of said primary ribs disposed on said second side oppositely to said primary ribs on said first side.

12. A blade according to claim 11 wherein said restart and primary ribs on said second side are staggered longitudinally relative to respective ones of said restart and primary ribs on said first side.

* * * * *